United States Patent [19]
Schanin et al.

[11] Patent Number: 5,477,476
[45] Date of Patent: Dec. 19, 1995

[54] POWER-CONSERVATION SYSTEM FOR COMPUTER PERIPHERALS

[75] Inventors: David J. Schanin, San Carlos; Richard R. Billig, Los Gatos, both of Calif.

[73] Assignee: Bayview Technology Group, Inc., San Carlos, Calif.

[21] Appl. No.: 91,643

[22] Filed: Jul. 14, 1993

[51] Int. Cl.$^6$ .................... G06F 1/32; G06F 3/03
[52] U.S. Cl. ............... 364/707; 364/492; 364/DIG. 1; 364/273; 364/273.1; 364/273.1; 364/273.3; 364/273.5; 395/750
[58] Field of Search ................ 364/421, 483, 364/492, 707, DIG. 1, DIG. 2; 395/750, 800; 340/310 A, 310 R

[56] References Cited

U.S. PATENT DOCUMENTS

| | | | |
|---|---|---|---|
| 4,663,539 | 5/1987 | Sharp et al. | 307/38 |
| 4,747,041 | 5/1988 | Engel et al. | 364/200 |
| 4,835,706 | 5/1989 | Asahi | 364/492 |
| 4,907,183 | 3/1990 | Tanaka | 364/707 |
| 4,980,836 | 12/1990 | Carter et al. | 364/483 |
| 5,142,684 | 8/1992 | Perry et al. | 395/750 |
| 5,214,785 | 5/1993 | Fairweather | 395/800 |
| 5,251,320 | 10/1993 | Kuzawinski et al. | 395/750 |
| 5,278,771 | 1/1994 | Nyenya | 364/492 |
| 5,283,905 | 2/1994 | Saadeh et al. | 395/750 |
| 5,309,563 | 5/1994 | Farrand et al. | 395/325 X |

OTHER PUBLICATIONS

*SCC User's Manual*, Zilog, Q4/92, pp. 1–1–4, 7–127–134.
*Inside Appletalk*, Apple Computer, Inc., Addison Wesley Publishing Company, Inc., Reading, Mass., 1990, pp. I-15-17; 1-3-6; 7-3-11; 10-2-12; 14-4-12, 19, 20, 29, 41-43.
*Microsoft MS-DOS User's Reference, Operating System 4.01*, Microsoft Corporation, 1988, pp. 97–99, 104, 108–110.
*PLC Printer Language Technical Reference Manual*, Hewlett–Paclard Part No. 33459–90903, USA, 1990, pp. 1-1-8; 9-1-7; 11-1-8; B-1-12.
*Postscript Language Reference Manual, Second Edition*, Adobe Systems Incorporated, Addison–Wesley Publishing Company, Inc., Reading Mass., 1992, pp. 69–71, 524, 525, 611–613, 616, 620–624, 698, 699.
*Microsoft Windows, Version 3.1, User's Guide for the Microsoft Windows Operating System*, Microsoft Corporation, 19921, pp. 199–215, 224–225.
"PowerSwitch LT" (Brochure) Radiant Enterprises, Inc., undated, two pages.
"Common Sense/CNX I", (Brochure) Radiant Enterprises, Inc., undated, one page.

*Primary Examiner*—Edward R. Cosimano
*Attorney, Agent, or Firm*—Clifton L. Anderson

[57] ABSTRACT

A power conservation system (PCS) includes a data handler, a controller and a power switch. The data handler is located between a host network and a network printer, while the power switch is between an AC power source and the printer's power input. The PCS can thus shut down the printer during periods when no data is being sent to the printer. The PCS monitors data to and from the printer, allowing it to track the printer's state and to capture its network identification. State tracking permits the PCS to emulate the printer when it is down and when it is booting. Additionally, the information stored in a state memory of the data handler can permit the printer's last ready state to be reconstructed after it turns on and boots to a ready state. In some cases, the data handler can answer network requests without turning on the printer. Thus, the PCS provides for effective power conservation while remaining invisible to a user.

6 Claims, 4 Drawing Sheets

POWER-CONSERVATION SYSTEM FOR COMPUTER PERIPHERALS

BACKGROUND OF THE INVENTION

The present invention relates to computer systems and, more particularly, to a system for emulating a computer peripheral, for example, to provide for power conservation. A major objective of the present invention is to provide for shutting down a printer and restarting it when needed in a manner invisible to a computer user.

The proliferation of personal computers has generated a dramatic increase in electrical power consumption. Several factors have contributed to this increased demand: 1) the increase in the number of personal computers; 2) moderate increases in the power required per personal computer; 3) increases in the number of computer peripherals; and 4) the increased power requirements of certain computer peripherals. The effects of this increased consumption have been to: 1) increase per employee costs for employers; 2) require utilities to increase electrical power generation and delivery; and 3) require major upgrading of electrical distribution systems within buildings. For these reasons, efforts are being made to reduce the power requirements of computer systems.

The laser printer has been a major contributor to the increased demand for electrical power. Most laser printers consume more than 800 watts while printing; moreover, they can consume between 90 and 240 watts in standby mode. These figures contrast with those of the previously prevalent impact printers: 200 watts during printing and 25 watts or less during standby.

The increase in standby power is particularly costly. The estimated average duty cycle for printers is 20% during the working day. Accordingly, laser printers can consume about 200 watts during the 80% of the working day that they are not printing. Furthermore, while computer systems are typically shut down overnight, laser printers are often left on. Shared network printers that are located in a common area, rather than a user's office, are especially likely to remain on overnight. Factoring in such "left-on" power consumption, the standby power utilization easily exceeds power consumption during printing.

There have been several attempts to address the problem of power consumption by computer peripherals when they are not being used. A "computer-monitoring" power-conservation system (CM-PCS) detects activity at the computer by monitoring for computer input (keyboard or mouse) activity. The peripheral is shut down after "long" intervals of inactivity, and turned on when such activity is detected. A CM-PCS effectively reduces after hours consumption by a peripheral dedicated to a single computer.

A CM-PCS is less effective at limiting power consumption during working hours. A computer user may spend hours typing on a keyboard without printing; during this typing the CM-PCS leaves a laser printer in standby mode. Thus, such a CM-PCS does not address effectively the power consumption problem entailed when the peripherals sit idle despite use of the host computer.

The problem of working-hours power control is complicated by the fact that printers store state information in volatile memory; this state information is lost when the printer is shut down. For example, many applications load software fonts into a printer. In some cases, "temporary" fonts are loaded and then deleted when the job that required them is completed. In other cases, "permanent" fonts are loaded on the assumption that they may be used for multiple print jobs. While there are provisions for deleting permanent fonts while the printer is on, they typically remain in the printer's memory until the printer is shut down. If the printer is shut down, the state must be restored when it is turned back on. This "reinitialization" procedure can be quite time consuming and disruptive to the user.

Moreover, applications that attempt to track the printer's state, e.g., permanent fonts, can lose track when a CM-PCS shuts a printer down. This problem could be addressed by designing software and hardware to be "PCS-aware". However, the industry-wide cooperation that this would require is lacking.

"Networked peripherals" typically require further attention to the problem of volatile state memory and permanent fonts. Networked peripherals interface to a computer network, which in turn can be connected to a number of computers. The peripheral can then be shared by as many computers as the network can support. Since each computer can affect the peripheral's state information, e.g., download permanent fonts, it would be cumbersome for each computer to track the state of each networked peripheral. Accordingly, the ability to respond to inquiries regarding peripheral states is built into some networked peripherals. This ability has been omitted from most "dedicated" (non-networked) peripherals that are designed to be slaved to a single "master" computer. (If the master computer is on a network, other networked computers may be able to access the peripheral through the master computer.)

Networked peripherals, like networked computers, have network identities that permit them to be distinguished from other devices on the network. Network identities can take the form of addresses and/or names. An address is usually a number assigned to a device. Some networks require a user or administrator to assign unique addresses to each network device. A more ergonomic approach is to provide each device with a programmable descriptive name. This name can be used instead of a numeric address, or else, the network protocol can automatically assign addresses to names. The user's responsibility in such a case is to change device names when necessary to avoid duplication.

Apple LaserWriters, and other Apple LocalTalk devices, have both user-programmable names and network-assignable addresses. The original Hewlett-Packard LaserJets were dedicated printers, while the original Apple LaserWriters were primarily networked peripherals. Over time, more printers have been designed for use both as networked and as dedicated peripherals.

In general, it would be impractical for a CM-PCS to monitor every computer sharing a networked peripheral. Instead, several identity-sharing power-conservation systems (IS-PCSs) have appeared that can be installed in a network and programmed with the same network identity as the printer; the IS-PCS can monitor network traffic addressed to the printer, and control the power to the printer.

IS-PCSs can be burdensome in that the user must program the IS-PCS so that it has the same address and/or name as the printer. This in turn involves installing special software in at least one of the networked computers. Any error in this programming will result in operational misbehavior. Furthermore, reprogramming can be required when there are changes in the network such as adding or replacing a printer. This can be onerous in environments where the network configuration is not static.

Additionally, networked printers are typically shared by many users, many of which may use the network's capability of loading additional fonts into the printer. When the printer is powered up by the IS-PCS, these fonts must be reloaded over the network. This operation can occupy significant network and host computer bandwidth as several megabytes of data are often involved.

Finally, once such a IS-PCS powers a printer on, it relinquishes the printer address. Often a computer trying to access the printer will "time-out" in the "boot" interval between power on and readiness to communicate with the network. The time-out will cause an error message to be presented to the user, which may be confusing and annoying. There are software packages that address this time-out problem, but each software solution introduces additional problems of compatibility with present and future software.

What is needed is a power-conservation system that requires simple hardware connections and no computer software additions or modifications, that once installed is invisible to the user (avoids error messages), that can adapt automatically to network changes, and can provide for reinitializing a printer (e.g., reinstalling software fonts) without tying up computer and network bandwidth.

SUMMARY OF THE INVENTION

The present invention provides a power-conservation system (PCS) comprising a power switch, a data handler and a controller. The power switch provides for control of power to a peripheral device (e.g., a laser printer) having alternative off, boot and ready conditions. Herein, "off" means power off, "ready" means ready to accept data, and "boot" refers to a transition condition after power on and before ready.

The data handler includes ready indicator means (e.g., its interface with the device or a timer) that indicates when the device is ready to accept data. The data handler also includes an emulator for generating responses to transmissions from the host system that, when viewed from the host system, could have been generated by the device. The emulator-generated responses occur not only while the device is off, but also during the boot interval. When the device is ready, the emulator generally defaults to the device for a response to host inquiries.

The controller monitors the data activity of the data handler. If the device is off and data activity begins, the controller commands the power switch to turn on the device. If the device is ready and no data is received, the controller begins a time-out routine. If, during the predetermined time-out interval, there is no data activity, the controller commands the power switch to turn off the device. Timing-out can be inhibited when the data-handler has insufficient information to reconstruct the state of the printer.

The data handler can include a data buffer through which all data destined for the device flows. The data buffer provides for a delay in the transmission of data received by the data handler to the device. By accepting the data into its buffer, the PCS can make it appear to the host that the device is receiving the data. Where the capacity of the data buffer is less than the capacity of the device, the emulator can signal the host to minimize the data transmission rate.

A state tracker can monitor the data from the host system and extract data that would affect the device's state. For example, permanent fonts and subroutines to be used for more than one print job would be extracted. The state tracker would process such state data and store the results in the state memory. When the device is turned off, its volatile state information is lost, but the information necessary to reconstruct this state information remains stored in the data handler's state memory. During succeeding off and boot conditions, the emulator can access the state memory to answer state specific inquiries from the host. Once the ready condition is reestablished, and before data in the data buffer is transferred to the device, the emulator uses the state data to restore the device to its state at the time of the most recent shut down.

Not all device state information is determined by host transmissions. For example, some network printers establish their own network addresses that they can transmit to a host network. This address information is typically preserved while the printer is off. Preferably, the state tracker identifies such device-generated state information for recordation in the state memory. The emulator can then access this information to properly answer address-specific inquiries from the host when the device cannot.

The present invention provides several advantages over the prior art. Installation is simple. Instead of being connected to the device, the host is connected to a host interface of the PCS. Instead of being coupled to an AC wall outlet, the AC plug of the device is plugged into an AC outlet of the PCS, which is plugged into the wall outlet. In the preferred embodiments of the present invention, no setting of switches on the device and no software setup are required. This contrasts with prior art PCSs for networks in which separate hardware or software procedures are required to establish the appropriate address for the PCS.

In some networks, adding a network device can cause existing devices to change their network addresses. The prior art would require user intervention to change the PCS address. The present invention provides for this change of network address to occur automatically.

Prior art PCSs would turn the power on to a device and then allow the device to resume control of the data path. Even in simple (non-network) configurations, this can cause an error message to be returned to the user. The error message can result from a "not ready" signal or from a time-out because data is not accepted as the device is booting. The user would likely be annoyed and/or confused; at best, the user would have to try the transmission later. The present invention provides emulatyion during booting; this permits the PCS, for example, to send a "ready but busy" signal to the host. This will delay, if not prevent, an error indication being returned to the user. Where the PCS includes a data buffer, it appears to the host that data is being accepted by the device. The emulator can slow data transmission through busy signals or slow handshaking where the data buffer is too small to accommodate an entire transmission.

The data tracking function incorporated by the present invention permits the PCS to respond to device specific requests (like "What fonts are stored in printer memory"). Prior art devices cannot answer such inquires. Typically, they turn on the device to provide for answering such inquires. If no further actions are required, the power on cycle nay be wasted. The PCS of the present invention can answer such questions without powering the device on. Thus, in this additional respect, the PCS is more efficient at conserving power than are prior art devices.

Furthermore, the present invention provides for storing a printer state during shutdown and restoring the printer state after booting. In the prior art, since the host "believes" that no shut down has occurred, it is misinformed as to the device state; this can cause the device to act differently than predicted by a host application. The re-initialization function of the PCS of the present invention solves this problem.

These and other features and advantages of the present invention are apparent from the description below with reference to the following drawings.

DESCRIPTION OF THE PREFERRED EMBODIMENTS

Figure 1:
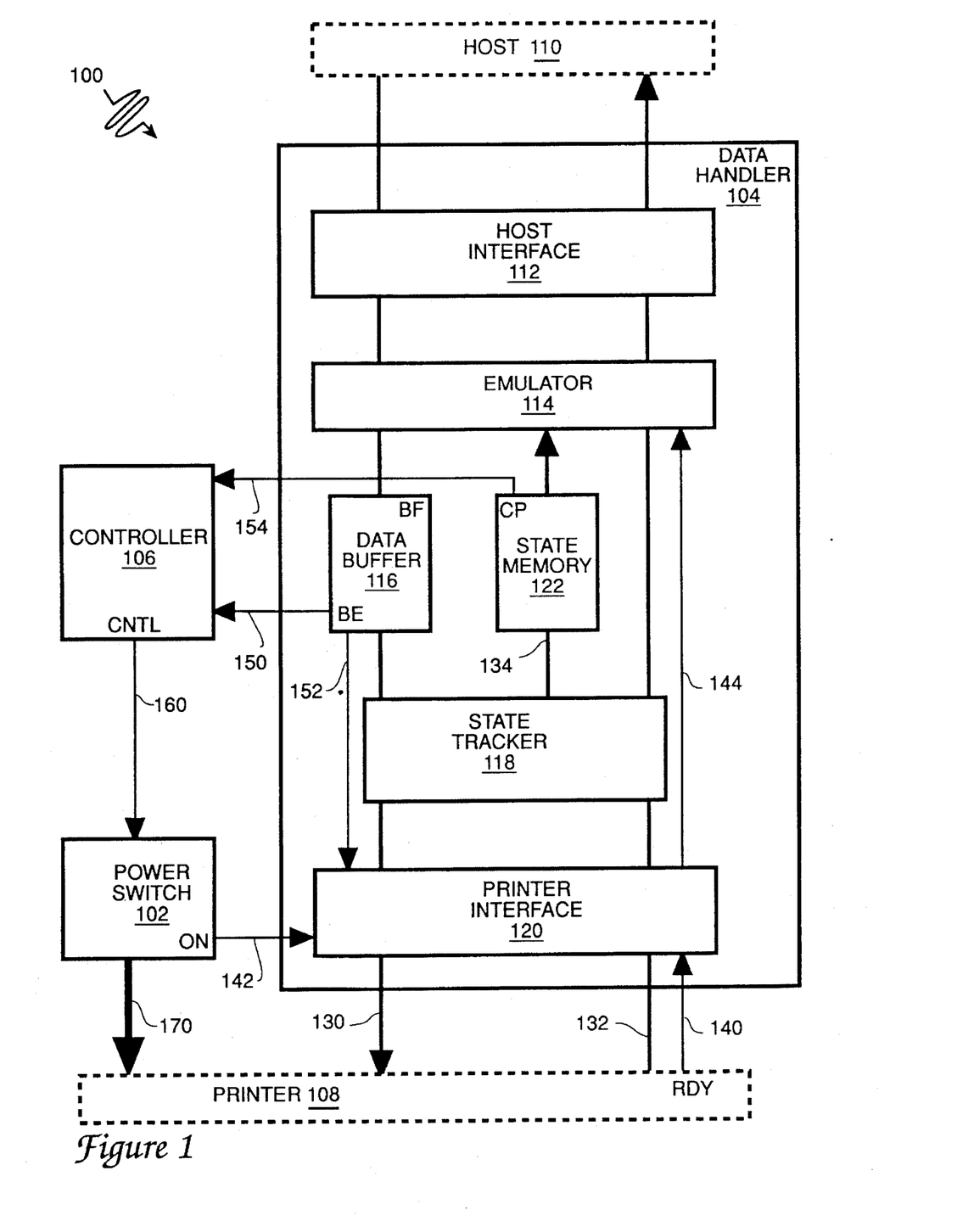
FIG. 1 is a functional block diagram of a power-conservation system in accordance with the present invention.

In accordance with the present invention a power-conservation system (PCS) 100 comprises a power switch 102, a data handler 104, and a controller 106, as shown in FIG. 1. PCS 100 is designed to control a network printer 108 on a host network 110. (For example, the printer can be an Apple LaserWriter on an Apple LocalTalk host network.) Printer 108 has three alternative conditions: power off ("off"), "boot" and "ready". The "ready" condition has two subconditions: "ready and available" for communication and "ready but busy" while processing a job.

Power switch 102 couples and decouples printer 108 to AC power as commanded by controller 106. Power switch 102 is a relay; alternatively other power switching devices such as silicon-controlled rectifiers (SCRs) can be used. Controller 106 is coupled to data handler 104 to determine whether or not data activity is present. Data activity can include: an indication from a host that it wants to send data, data transmission from host 110, and data transmission from PCS 100 to printer 108.

Data handler 104 functionally comprises a host interface 112, an emulator 114, a data buffer 116, a state tracker 118, a printer interface 120, and a state memory 122. There are three data paths through data handler 104. A host-data path 130 extends from host 110, through host interface 112, through emulator 114, through data buffer 116, through state tracker 118, through printer interface 120, to printer 108. A printer-data path 132 extends from printer 108, through printer interface 120, through state tracker 118, through emulator 114, through host interface 112, to host 110. A state-data path 134 extends from state tracker 118 through state memory 122 to emulator 114.

PCS system 100 includes a ready status path 140 from printer 108, to printer interface 120. In practice, when printer 108 is booting or ready, its ready information is reliable, but when printer 108 is off, the ready information may not be reliable. Power switch 102 provides an "on" status output along line 142 to printer interface 120. (To correspond more closely to the hardware perspective, it might be more appropriate to specify that controller 106 provides the "on" indication; since FIG. 1 is functional and the division of tasks somewhat arbitrary, an aesthetic choice is made to show the "on" indication coming from power switch 102.) Printer interface 120 ANDs the "on" status with the "ready" status to provide a "confirmed ready" signal to emulator 114 along line 144.

Buffer 116 provides a "buffer empty" signal BE along line 150 to controller 106, which uses the "buffer empty" signal to monitor data activity through data handler 104. The "buffer empty" signal is also provided, along a line 152, to printer interface 120 so that it knows when to stop requesting data. State memory 122 provides a "state complete" (CP) signal to controller 106 via a line 154. This signal indicates whether or not the information in state memory 122 is sufficient to reconstruct the state of printer 108 if it is shut down and restarted.

Controller 106 controls power switch 102 via control line (CNTL) 160. Power switch 102 accordingly supplies or withholds power along power line 170 to printer 108.

Figure 2:
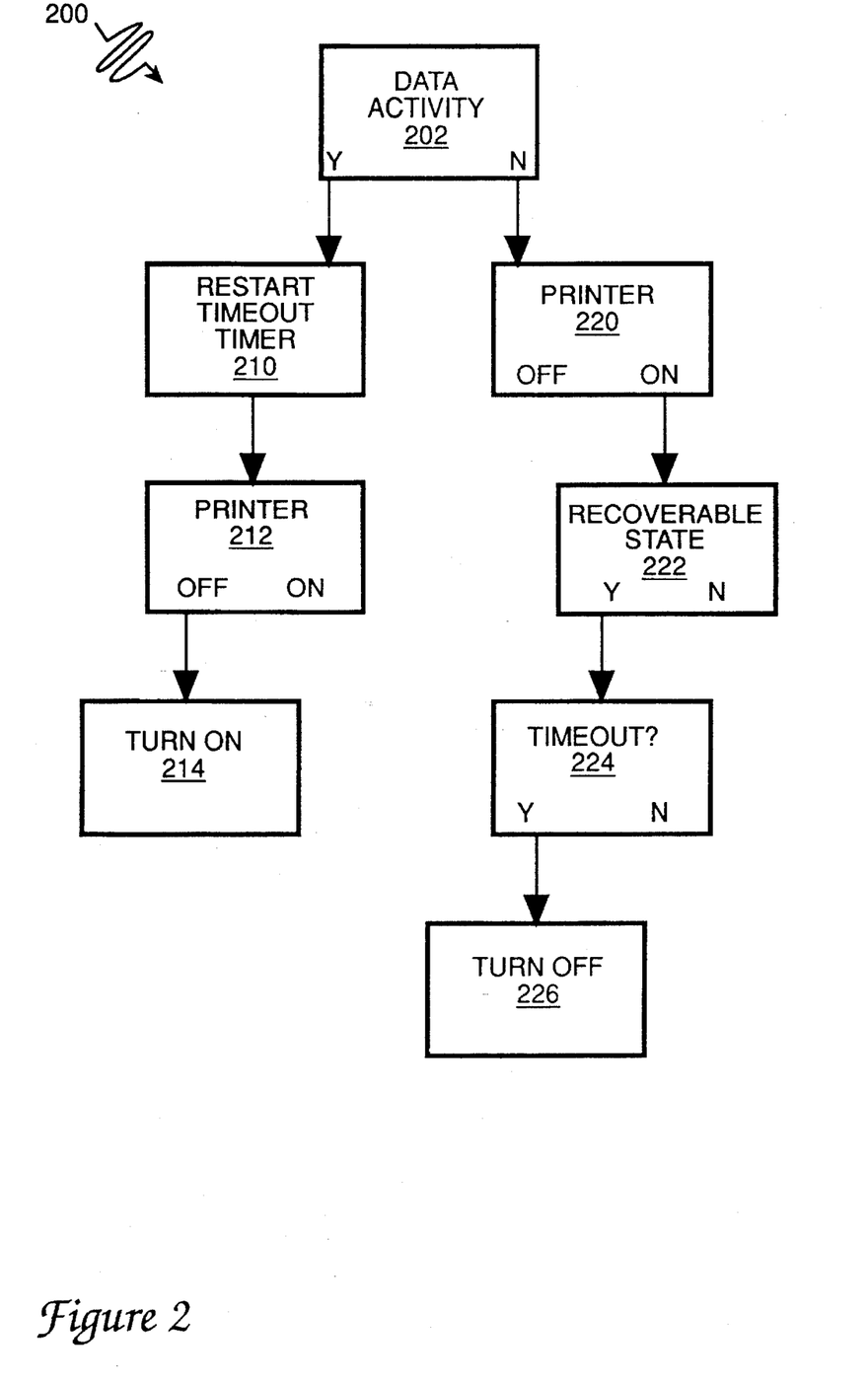
FIG. 2 is a flow diagram of a controller of the power-conservation system of FIG. 1.

The function of controller 106 is flow-charted in FIG. 2 as a method 200. Controller 106 monitors data activity through data handler 104 at 202. Conveniently, this monitoring is done by detecting the value of buffer empty line 150. Note that all branches of method 200 end with implied returns to monitoring step 202.

If there is data activity, controller 106 restarts its timeout timer at step 210. Controller 106 considers at step 212 the condition of printer 108. If printer 108 is off, it is turned on at step 214. If printer 108 is on, its power condition is not changed. "On" means booting or ready. Controller 106 does not and need not distinguish between boot and ready. In the case of data activity, for example, it is desirable to allow the boot and ready conditions to continue. Step 210 of restarting the timeout timer can be implemented anytime between the detection of data activity at step 202 and the next return to step 202 from step 212 or step 214.

If there is no data activity, controller considers at 220 the condition of printer 108. If printer 108 is off, controller 106 does not change the power condition of printer 108. If printer 108 is on, controller 106 considers at 222 the completeness of state memory 122. If the indication is that the state of the printer is unrecoverable, controller 106 does not change the condition of printer 108.

If the state information is sufficient to reconstruct the state of printer 108, controller 106 considers, at 224, whether or not a time-out has occurred. If a time-out has not occurred, controller 106 does not change the condition of printer 108; if a time-out has occurred, controller 106 shuts off printer 108 at 226.

In general, it would be undesirable to turn off printer 108 while it is booting. A turn-off during boot could be prevented by providing a ready indication to controller 106. In practice, this is not necessary as long as the time-out interval is longer than the boot interval. Furthermore, in most cases, there is data activity during booting.

The operation of PCS 100 is further described using an illustrative sequence of events. PCS 100 is installed between printer 108 on the one hand, and host 110 and an AC source on the other. The three are turned on in the following order, PCS 100, printer 108 and host 110.

As soon as it is "ready", printer 108 engages in a network dialogue to ensure that it assumes an address consistent with all other equipment of host 110. This activity is monitored by data handler 104 so that when printer 108 announces its selected address, this announcement is detected by state tracker 118 and stored in state memory 122.

Shortly after network addresses are established, a computer of host 110 requests whether printer 108 has fonts T and P in its volatile memory. Host interface 112 passes the request to emulator 114. Emulator 114 determines from ready path 144 that printer 108 is confirmed ready. Emulator 114 forwards the request to data buffer 116, which forwards the request to printer interface 120, which forwards the request to printer 108. Printer 108 responds in the negative along printer-data path 132 through printer interface 120, through state tracker 118, through emulator 114, through host interface 112, to host 110. Due to the activity of data buffer 116, the "buffer empty" indication is negative, and the time-out timer is repeatedly reset.

The computer sends fonts T and P, with indications that T is to be a temporary font and P is to be a permanent font. The font data is directed along path 130 to printer 108. State tracker 118 analyzes the throughgoing data, and determines that P is a permanent font. Accordingly, state tracker 118 stores a copy of permanent font P in state memory 122.

To save memory space, state tracker 118 stores only an identifier for temporary font T in state memory 122, leaving out the description of font T. State tracker 118 sets the "complete" indicator to negative. Thus, printer 108 will not be shut down while a temporary font is installed. (Alternatively, state tracker 118 can store temporary font T and delete it after the next print job.) Fonts T and P are stored in printer 108. The computer sends a document to be printed along host-data-path 130.

When document printing is completed, printer 108 deletes temporary font T, state tracker 118 resets the CP indicator to positive, and buffer 116 sends a "buffer empty" signal along line 150 to controller 106, which thus allows a timeout to progress. Before the timeout is completed, a second print job arrives from the computer along host-data path 130, through buffer 116 and to printer 108. The second print job contains no state information, so it is not acted on by state tracker 118.

As the second print job is completed, data buffer 116 empties. A "buffer empty" indication is directed to controller 106, which allows the timeout to progress. State memory 122 continues its "complete" indication to controller 106, indicating that the printer state is recoverable. The timeout is completed, so controller sends an "off" command along line 160. Switch 102 turns off and printer 108 shuts down (enters its "off" condition). The ready indicator along path 140 is unreliable while printer 108 is off. However, an "off" indication along 142 causes printer interface 120 to send a confirmed "not-ready" to emulator 114 along line 144.

The computer requests along host-data path 130 whether printer 108 is available. Since emulator 114 "knows" that printer 108 is not ready, it does not pass this data to data buffer 116. Instead, emulator 114 issues an "available" response to host 110. The computer then requests a listing of permanent fonts installed in printer 108. Emulator 114 inspects state memory 122, and responds that font P is stored in printer 108.

There is then an extended period of inactivity. It is noted that emulator 114 has been able to stand in place of printer 108, completing an exchange without activating printer 108. Accordingly, considerable power savings can accrue from this emulation.

Eventually, a print job arrives. The document to be printed is progressively stored in buffer 116. Buffer 116 sets the "buffer empty" indicator negative; accordingly, controller 106 commands power switch 102 to turn on printer 108.

During the boot period, which can be on the order of a minute, printer 108 is not ready to respond to host 110. During the boot period, emulator 114 sends delayed acknowledgments to host 110. The delays are long enough so that buffer 116 does not fill before printer 108 is ready. The delays are short enough that host computer timeouts are not completed so that transmission continues and the user is undisturbed. If, for example, buffer 114 accepts one byte just before each potential computer time-out, the interval over which a computer time-out would occur is maximized. During the boot period, emulator 114 responds to host requests about the printer state.

Generally, communication protocols specify maximum and minimum transmission rates. Most equipment strives to operate at the maximum transmission rate. The present invention provides for operation at a minimum transmission rate during booting.

Eventually, printer 108 is ready. Printer 108 then engages in a network contention dialogue intended for host 110. Emulator 114 assumes control of this dialog and forces printer 108 to assume the address it had when it was shut down. The old address is stored in state memory 122. Typically, printer 108 stores its last address upon shutdown and requests this address upon startup. In this case, emulator 114 simply confirms that printer 108 can keep this address. If for some reason, the old address is lost from printer memory, printer 108 makes random address requests. Emulator 114 denies all such requests until the previously assigned address is requested. At that point, emulator 114 grants the request to assume the address.

If while the printer is off or booting, another device requests the address of printer 108, emulator 114 announces that the address is already taken. The other device is then forced to assume another address.

Once booting is complete, the ready signal from printer 108 is ANDed with the ON signal from power switch 102, yielding a confirmed ready indication to emulator 114. Emulator 114 accesses state memory 122, where it finds permanent font P and other configuration information regarding the state of printer 108 before shutdown. Emulator 114 sends this information to printer 108 to reconstitute its state before shutdown, e.g., installing permanent font P.

Then the computer tries to down load several permanent fonts. This font download fits within the memory of printer 108 but not in state memory 122. Accordingly, state tracker 118 lists the identities of the permanent fonts stored in printer 108s, but discards the descriptions of the individual characters. If state memory 122 is nearing overflow, state tracker 118 can dump the description of permanent font P as well. State tracker 118 then sets the "complete" indicator negative. This prevents controller 106 from shutting down printer 108.

Subsequently, a computer instructs printer 108 to cancel all permanent fonts. This instruction is executed by printer 108. State tracker 118 responds by canceling the relevant font identifications from state memory 122. At this point, the state memory is sufficient to reconstruct the state memory of printer 108. Accordingly, state tracker 118 sets the "complete" indication positive. Controller 106 then will check for timeout in response to data inactivity.

A hardware implementation of PCS 100 comprises a microcontroller 382, a static random access memory (SRAM) 384, a communication circuit 386, and AC power switch 102. New numbers are required generally since there is no direct correspondence between hardware and the implemented process. There is a close correspondence for power switch 102 (except, as noted earlier, the hardware switch does not provide the "on" indication to printer interface 120). Not surprisingly, control line 160 and power line 170 can be identified in FIG. 3. Communications circuit 386 is a Zilog 8530, approved for LocalTalk. Circuit 386 provides two communications channels generically labeled channel A and channel B that correspond respectively to host interface 112 and printer interface 120.

Figure 3:
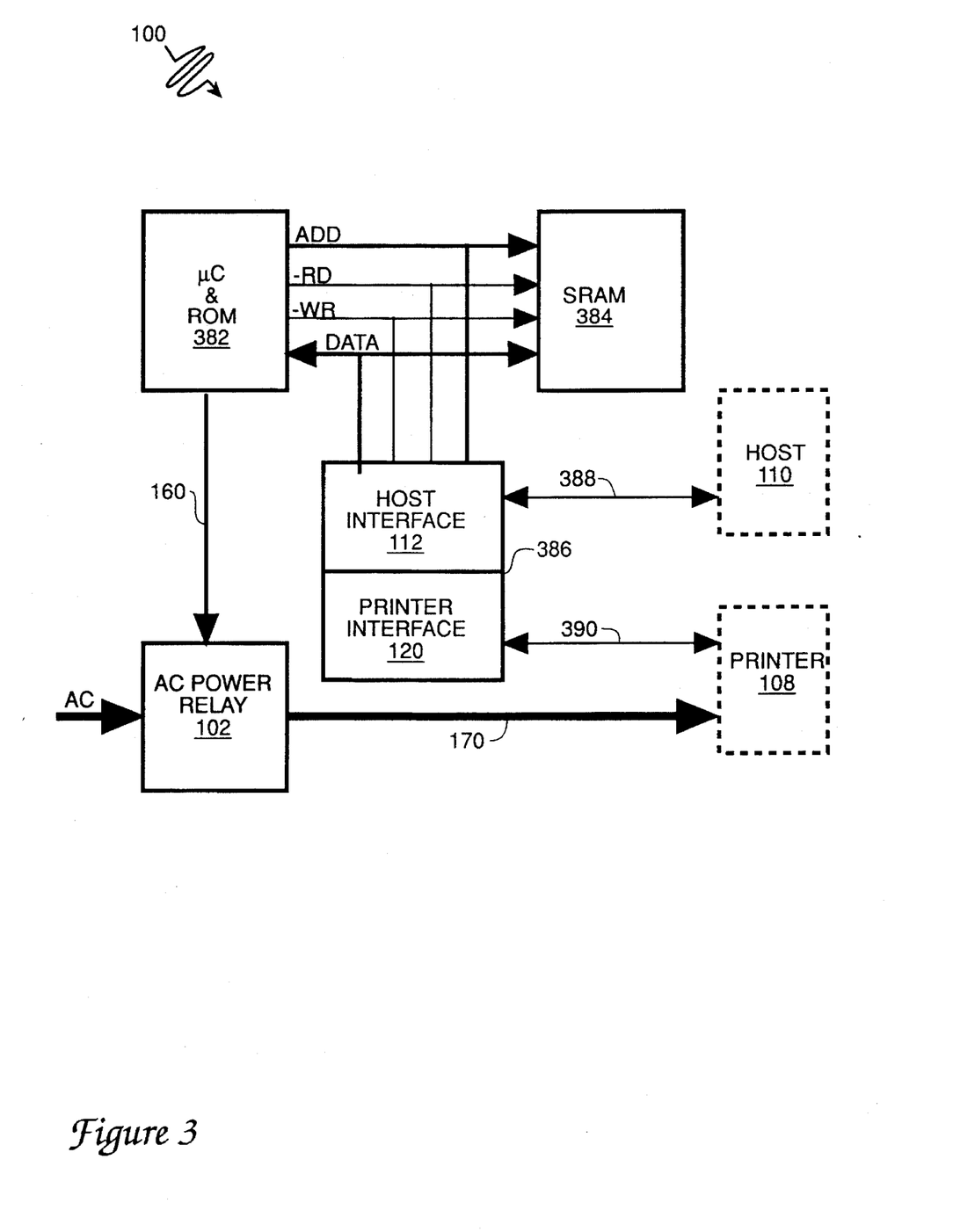
FIG. 3 is a component block diagram of the power-conservation system of FIG. 1

SRAM 384 corresponds generally to both data buffer memory 116 and state memory 122. Microcontroller 382 is an Intel 8051, which includes four kilobytes of read only memory (ROM). Thus, microcontroller 382 includes both a processor and a program to be executed by the processor. The program corresponds generally to controller 106, emulator 114 and state tracker 118. Bi-directional communication lines 388 between host interface 112 and host 110 provide the functionality of host data line 130 and printer data line 132 between these two units. Likewise, bi-directional communications line 390 between printer interface 120 and printer 108 provides the functionality of data lines 130 and 132 as well as of status line 140 between these two units.

A data bus (DATA), an address bus (ADD), a read line (-RD) and a write line (-WR) all provide conventional hardware functions. Data bus DATA provides all functionality with PCS 100 of data lines 130, 132, and 134 as well as of most of the status lines. The functions of the address bus ADD and the -WR and -RD lines are not explicit in the functional diagram of FIG. 1.

SRAM 384 has a one-megabyte capacity. This is suitable for a moderate size network. A larger memory can reduce the number of situations in which shut down needs to be inhibited because the printer state is not recoverable. However, much smaller memories are usable. For example, eight kilobytes provides for a practical buffer and a minimal state memory.

It should be noted that the preferred controller, an Intel 8051, provides for 16-bit addressing using a multiplexed address/data bus. This address multiplexing scheme is well known, so the required additional components, e.g., latches, are omitted from the figures.

Figure 4:
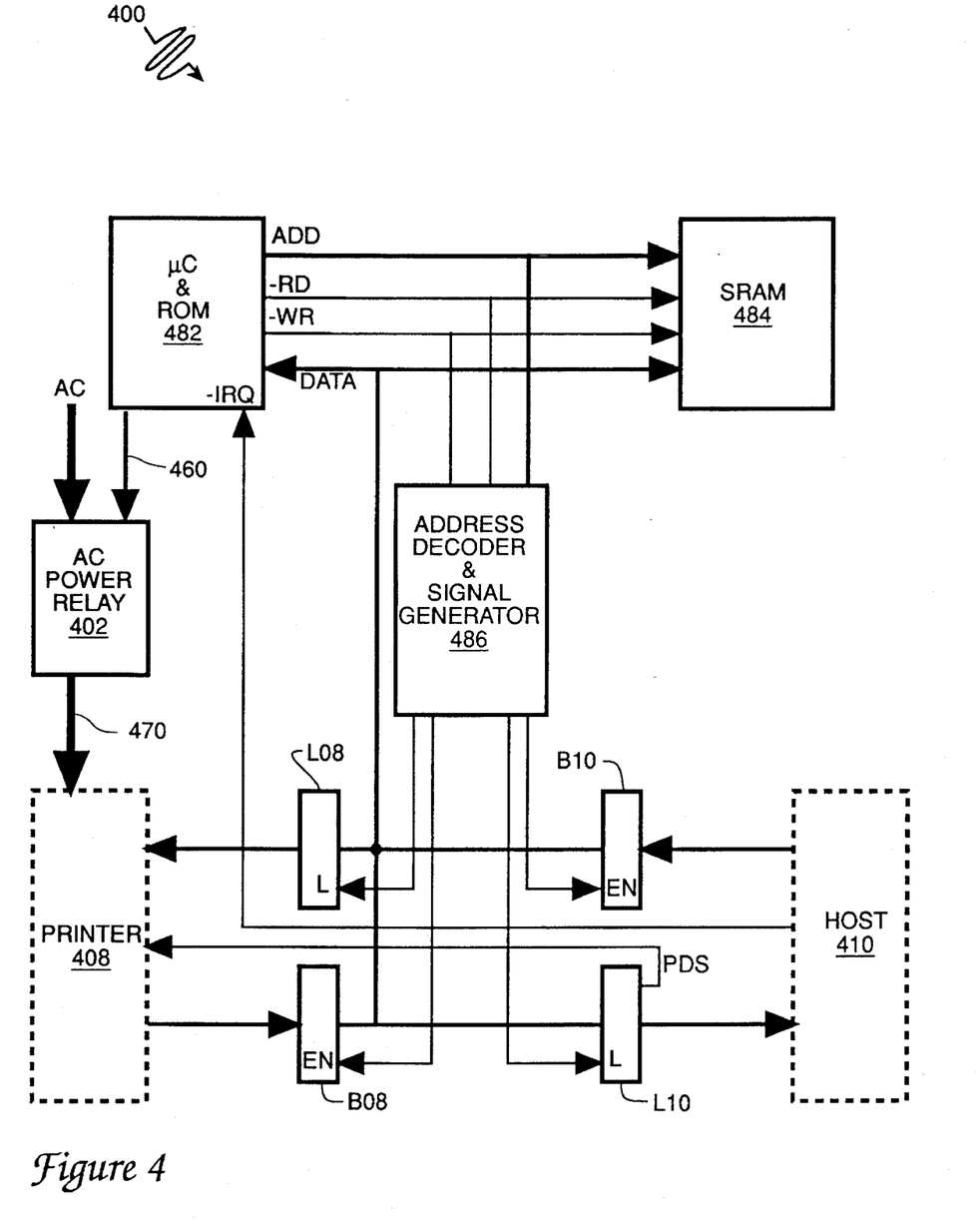
FIG. 4 is a block diagram of a non-network realization of the present invention.

Power conservation system (PCS) 400 is a modification of PCS 100 for non-network environments, for example, a Microsoft Disk-Operating System (MS-DOS) environment in which a printer is dedicated to an IBM-compatible computer via a Centronics parallel port.

PCS 400 comprises a microcontroller 482, an SRAM 484, an address decoder and signal generator 486, an AC power switch 402, a host hardware interface buffer B10, a host hardware interface latch L10, a printer hardware interface buffer B08, and a printer hardware interface latch L08, as shown in FIG. 4.

When host 410 sends data and a data strobe intended for printer 408, the data and strobe are intercepted by microcontroller 482 (at its data port and interrupt port "-IRQ", respectively). The data strobe line is buffered before being presented to the interrupt request line or being used to latch the data. The data is treated generally as described with respect to PCS 100. When microcontroller 482 sends data to printer 408, it loads the data byte-by-byte into latch L08. Printer 408 requires a strobe bit to know when to look for valid data. Since the data bus DATA and latch L08 are designed for 8-bit transfers, they cannot accommodate an additional strobe bit. Accordingly, a spare bit of host latch L10 is used for the printer data strobe PDS.

Printer 408 sends five types of status signals, intended for host computer 410, i.e., "fault", "paper error", "acknowledge", "select" (i.e., "online") and "busy" (i.e., "not ready"). These are intercepted by buffer B08 and microcontroller 482. The actual or emulated status signals are forwarded to host 410 via latch L10. The status signals occupy only five of eight bits available on data bus DATA and latch L10. This leaves room for PDS as discussed above. Address decoder and signal generator 486 decodes addresses from microcontroller 482 to select the correct buffers and latches for communications with host 410 and printer 408.

The AC line, control line 460 and power line 470 operate just as do their counterparts in PCS 100. In view of the simpler non-network dedicated relationship between host 410 and printer 408, only eight kilobytes of SRAM are employed. Fewer downloadable fonts are used in a PC environment, so additional SRAM may not be cost effective.

While the present invention has been described for use with printers, it can apply to other peripherals as well. Furthermore, the "peripheral device" can be an office computer; the "host" can be a remote computer communicating via a modem. A remote access via modem can be used to trigger a PCS to wake up the office computer so that it can receive the message. Without the PCS, the office computer would have had to be left on to be accessible. There are devices that will turn on an office computer remotely, but these suffer the same disadvantages as prior-art printer PCSs. For example, the remote computer will time-out before booting is complete. The present invention would accept some of the data to prevent a time-out while the computer boots.

It is also recognized that the data handler of the present invention has applications other than power conservation. For example, the data handler can be used to forward a print job intended for a printer than is being repaired to another network printer. This would be accomplished invisibly from the perspective of the user. These and other modifications to and variations upon the preferred embodiments are provided for by the present invention, the scope of which is limited only by the following claims.

What is claimed is:

1. A system for conserving power consumed by a device designed to receive host data from a host, said system comprising:

a power switch for turning on and shutting down said device, said power switch being coupled to said device for controlling the supply of power thereto, said power switch turning on said device in response to an on command, said power switch turning off said device in response to an off command;

a data handler for handling data activity, said data activity including receiving said host data from said host, and said data activity including transmitting said host data to said device, said data handler including ready indicator means for receiving a ready signal from said device after a most recent on command and for determining when said device is ready to accept data, and an emulator for, after a most recent on command but before said device is ready to accept data, transmitting emulator data to said host that corresponds to device data that could have been transmitted by said device if a most recent off command had not been issued; and a controller for controlling said power switch, said controller being coupled to said data handler for determining whether data activity is present, said controller including a timer for determining in response to said determination of data activity when a time-out interval of data inactivity has elapsed, said controller being coupled to said power switch for sending said on and off commands thereto, where said controller sends said on command when, while said device is off, data activity is detected, and said controller sends an off command when, while said device is on, said time-out interval of data inactivity has elapsed.

2. A system as recited in claim 1 wherein said data handler includes a data buffer into which said host data is stored upon reception from said host and from which host data is transmitted to said device.

3. A system as recited in claim 2 said causes the rate at which said host data is received by said data buffer to be slower while said device is booting to said ready state than it is while said device is in its ready state.

4. A system as recited in claim 2 wherein said data handler further includes:

a state memory for storing state data representing the most recent ready state of said device, and a state tracker for, while said device is ready, tracking the state of said device,
said state tracker extracting state-pertinent data from said host data,
said state tracker processing said state-pertinent data to determine its effect on the device state,
said state tracker being coupled to said data buffer for receiving host data therefrom,
said state tracker being coupled to said state memory for storing state data therein, and
said state tracker setting an indicator in said state memory indicating whether or not a present state of said device can be restored if said device is shut down and then restarted;

said controller being coupled to said state memory for accessing said indicator so that said controller can refrain from sending said off command when said present state could not be reconstructed if said device is shut down and then restarted.

5. A system as recited in claim 2 wherein said data handler further includes:

a state memory for storing state data representing the most recent ready state of said device, and a state tracker for, while said device is ready, tracking the state of said device,
said state tracker extracting state-pertinent data from said host data,
said state tracker processing said state-pertinent data to determine its effect on the device state,
said state tracker being coupled to said data buffer for receiving host data therefrom,
said state tracker being coupled to said state memory for storing state data therein, said emulator being coupled to said state memory for accessing state data therefrom, said emulator converting said state data into initialization data for restoring said device to the state represented in said state memory, said data handler means transmitting said initialization data to said device before host data in said buffer is transmitted thereto when said device first becomes ready after said on command.

6. A system as recited in claim 5 wherein said state tracker is coupled to said device for receiving device-state data transmitted therefrom, said tracker using said device-state data to update said state memory.

* * * * *